United States Patent [19]

Liu

[11] Patent Number: 5,026,760

[45] Date of Patent: Jun. 25, 1991

[54] WARPAGE CONTROLLED POLYESTERS

[75] Inventor: Ping Y. Liu, Naperville, Ill.

[73] Assignee: General Electric Company, Mt. Vernon, Ind.

[21] Appl. No.: 430,405

[22] Filed: Nov. 2, 1989

[51] Int. Cl.$^5$ ............................................. C08L 67/02
[52] U.S. Cl. .................................. 524/449; 524/538; 525/425
[58] Field of Search .................. 525/425; 524/449, 538

[56] References Cited

U.S. PATENT DOCUMENTS 4,598,117 7/1986 Liu ...................................... 524/444
4,639,486 1/1987 Liu ...................................... 524/409
4,659,765 4/1987 Liu ...................................... 524/447

Primary Examiner—Patricia Short
Attorney, Agent, or Firm—William F. MuFatti; Daniel DeJoseph

[57] ABSTRACT

Disclosed are thermoplastic polyester composition that display increased resistance to warpage. The compositions are comprised of at least one polyester resin modified with a warpage control agent, said warpage control agent being a high molecular weight polyetherimide ester elastomer. The resulting composition is preferably reinforced with glass fibers.

18 Claims, No Drawings

WARPAGE CONTROLLED POLYESTERS

BACKGROUND OF THE INVENTION

High molecular weight linear polyesters and copolyesters of glycols and terephthalic or isophthalic acid or combinations of the two acids are well known and have enjoyed continued and increasing commercial success. These are especially useful resins because they provide compositions with excellent moldability, and molded articles therefrom having smooth and glossy surface appearance, high strength, stiffness temperature resistance and other desirable properties. These polyesters are described inter alia in Whinfield et al, U.S. Pat. No. 2,465,319 and in Pengilly, U.S. Pat. No. 3,047,539, incorporated herein by reference. These patents disclose that the polyesters are particularly advantageous as film and fiber formers.

Additionally, these resins may be modified to improve certain physical properties and further broaden their scope of application by incorporating therein various additives including fillers and reinforcing agents to enhance toughness and vary the stiffness of the material.

Blends of such polyester resins with one or more second resins have become of significant commercial interest because such second resins, carefully selected, can greatly improve impact strength, as well as tensile strength, modulus and distortion temperature under load in parts molded from such compositions.

DESCRIPTION OF THE INVENTION

It has been surprisingly discovered that, by admixing a minor amount of a high molecular weight polyetherimide ester elastomer with a polyester resin, preferably a glass resin reinforced polyterephthalate resin, the resulting molded composition has improved resistance to warpage.

The high molecular weight polyetherimide ester elastomers and can be prepared according to the method taught in U.S. Pat. No. 4,556,688, to McCready et al, and U.S. Pat. Nos. 4,544,734 and 4,556,705, to McCready, all of which are incorporated herein by reference. In particular, processes by which high molecular weight polyetherimide ester polymers can advantageously be prepared are set forth in U.S. Pat. No. 4,732,948, to McCready et al, which is also incorporated herein by reference.

The preferred high molecular weight polyetherimide ester elastomers utilized in the present invention will be defined as having an intrinsic viscosity greater than 1.2 and most preferably greater than 1.4, wherein intrinsic viscosity is defined as the ratio of a solution's specific viscosity to the concentration of the solute, extrapolated to zero concentrate. In the present instance, the solution utilized in the measurement of the intrinsic viscosity of the polyetherimide ester elastomer utilized in the examples of the present invention consist of 40% by weight phenol and 60% by weight tetrahydrofuran (THF); wherein said measurements were conducted at ambient temperature, appx. 25° C.

The polyester resins utilized in this invention include, in general, linear saturated condensation products of diols and dicarboxylic acids, or reactive derivatives thereof. Preferably, they will comprise condensation products of aromatic dicarboxylic acids and aliphatic diols. It is to be understood that it is also possible to use polyesters such as poly(1,4-dimethylol cyclohexane dicarboxylates, e.g., terephthalates). In addition to phthalates, small amounts of other aromatic dicarboxylic acids, such as isophthalic dicarboxylic acid, naphthalene dicarboxylic acid, or aliphatic dicarboxylic acids, such as adipic acid, can also be present in preferred compositions. The diol constituent can likewise be varied, in the preferred embodiments, by adding small amounts of cycloaliphatic diols. In any event, the preferred polyesters are well known as film and fiber formers, and they are provided by methods outlines in Whinfield, U.S. Pat. No. 2,465,319 and Pengilly, U.S. Pat. No. 3,047,539 and elsewhere. The preferred polyesters will comprise a poly(alkylene terephthalate, isophthalate or mixed isophthalate-terephthalate, e.g., up to 30 mole percent isophthalate), said alkylene groups containing from 2 to 10 carbon atoms, e.g., poly(ethylene terephthalate) or poly(1,4-butylene terephthalate).

While poly(1,4-butylene terephthalate)homopolyester is the preferred poly(butylene terephthalate) polymer, copolyesters thereof are also suitable. Such copolyesters generally comprise at least about 70 mole percent, and preferably at least 80 mole percent, based on total monomer content, of butylene and terephthalate units. The comonomer may be either a dicarboxylic acid or diol or a combination of the two. Suitable dicarboxylic acid comonomers include the $C_8$ to $C_{16}$ aromatic dicarboxylic acids, especially the benzene dicarboxylic acids, i.e. phthalic and isophthalic acids and their alkyl, e.g. methyl, derivatives and $C_4$ to $C_{16}$ aliphatic and cycloaliphatic dicarboxylic acids including, for example, sebacic acid; glutaric acid; azelaeic acid; tetramethyl succinic acid; 1,2-, 1,3- and 1,4-cyclohexane dicarboxylic acids and the like, as mentioned above. Suitable diol comonomers include but are not limited to $C_2$ to $C_8$ aliphatic and cycloaliphatic diols, e.g. ethylene glycol, hexanediol, butanediol and 1,2-, 1,3- and 1,4-cyclohexanedimethanol. Other suitable diols are well known to those skilled in the art.

This invention relates to reinforced terephthalate molding compositions which have increased warpage resistance in the molded article. More particularly, it pertains to composition comprising a poly(1,4-butylene terephthalate) resin and/or a poly(ethylene terephthalate) resin, a reinforcement agent such as glass fibers and, optionally, a filler, which are rendered with increased resistance to warpage by being admixed with a minor amount of a high molecular weight polyetherimide ester resin.

The high molecular weight polyetherimide ester elastomers utilized in the invention contain imide groups, polyether groups, and ester groups in the polymer chain. They are comprised of the reaction products of:
(i) at least one diol;
(ii) at least one dicarboxylic acid or its ester forming reactive derivative; and
(iii) a set of reactants selected from
   (a) (1) at least one high molecular weight poly(oxy alkylene)diamine, and (2) at least one tricarboxylic acid or its derivative, or
   (b) at least one high molecular weight polyoxyalkylene diimide diacid.

The high molecular weight polyetherimide esters of the present can preferably be formed by the procedures of U.S. Pat. No. 4,732,948. The above patent teaching forming a polyetherimide ester oligomer by contacting the above reactants at an elevated temperature and for a period of time effective to form the oligomer and thereafter heating the oligomer at a temperature effective to further polymerize the oligomer to a high molecular weight polyetherimide ester but below the melting point of the oligomer.

Suitable diols (i) for use in the preparation of the high molecular weight polyetherimide ester polymers of the present invention include the saturated and unsaturated aliphatic and cycloaliphatic dihydroxy compounds as well as the aromatic dihydroxy compounds. These diols are preferably of a low molecular weight, i.e., having a molecular weight of about 250 or less. When used herein, the term "diol" and "low molecular weight diol" should be construed to include equivalent ester forming derivatives thereof provided, however, that the aforementioned molecular weight requirement pertains to the diols only and not to their ester forming derivatives. Exemplary of ester forming derivatives of diols there may be given the acetates of the diols as well as, for example, ethylene oxide or ethylene carbonate for ethylene glycol.

The preferred saturated and unsaturated aliphatic and cycloaliphatic diols are those having from 2 to about 15 carbon atoms. Exemplary of these diols there may be given ethylene glycol, propanediol, butanediol, pentanediol, 2-methyl propanediol, 2,2-dimethyl propanediol, hexanediol, decanediol, 1,2-, 1,3- and 1,4-cyclohexane dimethanol, butenediol, hexenediol, etc. Especially preferred are 1,4-butanediol and mixtures thereof with hexanediol, 1,4-cyclohexane dimethanol, or butenediol, most preferably 1,4-butanediol.

Aromatic diols suitable for use in the practice of the present invention are generally those having from 6 to about 15 carbon atoms. Included among the aromatic dihydroxy compounds are resorcinol, hydroquinone, 1,5-dihydroxy naphthalene, 4,4'-dihydroxy naphthalene, 4,4'-dihydroxy diphenyl, bis(p-hydroxy phenyl)methane and bis(p-hydroxy phenyl)-2,2-propane.

Where more than one diol is employed, it is generally preferred that at least about 60 mole %, based on the total diol content, be the same diol, more preferably at least 80 mole %. As mentioned above, the preferred compositions are those in which 1,4-butanediol is present in a predominant amount, most preferably when 1,4-butanediol is the only diol.

Dicarboxylic acids (ii) which are suitable for use in the practice of the present invention are aliphatic, cycloaliphatic, and/or aromatic dicarboxylic acids. These acids are preferably of a low molecular weight, i.e., having a molecular weight of less than about 300. However, in some cases higher molecular weight dicarboxylic acids may be used. The term "dicarboxylic acids" as used herein, includes equivalents of dicarboxylic acids having two functional carboxyl groups which perform substantially like dicarboxylic acids in reaction with glycols and diols in forming polyesters. These equivalents include esters and ester forming reactive derivatives, such as acid halides and anhydrides. The molecular weight preference mentioned above pertains to the acid and not to its equivalent ester or ester-forming derivatives. Thus, an ester of a dicarboxylic acid having a molecular weight greater than about 300 or an acid equivalent of a dicarboxylic acid having a molecular weight greater than about 300 are included provided the acid has a molecular weight below about 300. Additionally, the dicarboxylic acids may contain any substituent group(s) or combinations which do not substantially interfere with the polymer formation and use of the polymer of this invention.

Aliphatic dicarboxylic acids, as the term is used herein, refer to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxyic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radical such as —O— or —SO$_2$—.

Representative aliphatic and cycloaliphatic acids which can be used for this invention are sebacic acid, 1,2-cyclohexane dicarboxylic acid, 1,3-cyclohexane dicarboxylic acid, adipic acid, glutaric acid, succinic acid, oxalic acid, dimer acid, 4-cyclohexene-1,2-dicarboxylic acid, 2-ethysuberic acid, tetramethylsuccinic acid, cyclopentanedicarboxylic acid, decahydro-1,5 naphthlene dicarboxylic acid, 4,4'-bicyclohexyl dicarboxylic acid, decahydro-2,6 naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexane dicarboxylic acids, sebacic acid, glutaric acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl)methane, oxybis(benzoic acid), ethylene-1,2-bis(p-oxybenzoic acid), 1,5-naphthalene dicarboxylic acid, 2,6-naphthalene dicarboxylic acid, 2,7-napthalene dicarboxylic acid, phenantherene dicarboxylic acid, anthracene dicarboxylic acid, 4,4'-sulfonyl dibenzoic acid, and halo and $C_1$–$C_{12}$ alkyl, alkoxy, and aryl ring substitution derivatives thereof. Hydroxy acids such as p(beta-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids those with 8–16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least 80 mole %, based on 100 mole % of dicarboxylic acid (ii) be the same dicarboxylic acid or ester derivative thereof. As mentioned above, the preferred compositions are those in which dimethylterephthalte is the predominant dicarboxylic acid, most preferable when dimethylterephthalate is the only dicarboxylic acid.

The polyetherimide ester polymers of the present invention may be prepared by a one-pot synthesis involving the reaction of the diol (i), the dicarboxylic acid (ii), the high molecular weight poly(oxy alkylene)diamine (iii) (a) (1), and the tricarboxylic acid or its derivative (iii) (a) (2). In such a synthesis the polyoxyalkylene diimide diacid (iii) (b) is formed in-situ by the reaction of the poly(oxy alkylene)diamine with the tricarboxylic acid.

The poly(oxy alkylene)diamines (iii) (a) (1) suitable for use in the present invention may be represented by the following general formula

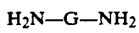

wherein G is the radical remaining after the removal of the amino groups of a long chain alkylene ether diamine. These polyether diprimary diamines are available commercially from Texaco Chemical Company under the trademark JEFFAMINE. In general they are prepared by known processes for the amination of glycols. For example, they may be prepared by aminating the glycol in the presence of ammonia, Raney nickel catalyst and hydrogen as set forth in Belgium Pat. No. 634,741. Alternately, they may be prepared by treating glycol with ammonia and hydrogen over a Nickel-Copper-Chromium catalyst as taught by U.S. Pat. No. 3,654,370. Other methods for the production thereof include those taught by U.S. Pat. Nos. 3,155,728 and 3,236,895 and French Nos. 1,551,605 and 1,466,708, all of the foregoing patents being incorporated herein by reference.

The long chain ether diamines suitable for use herein are the polymeric diamines having terminal (or as nearly terminal as possible) amine groups and an average molecular weight of from about 600 to about 12,000, preferably from about 900 to about 4,000. Additionally, the long chain ether diamines will generally have a carbon-to-oxygen ratio of from about 1.8 to about 4.3.

Representative long chain ether diamines are the poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide); terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4-butanediol and 1,5-pentanediol and subsequently aminating are useful. Especially preferred poly(alkylene ether) diamines are poly(propylene ether)diamine, poly (tetramethylene ether)diamine, and the poly(ethylene)glycols which are end-capped with poly(propylene ether) and/or propylene oxide and subsequently aminated.

In general, the polyoxyalkylene diamines useful in the practice of the present invention have an average molecular weight of from about 600 to about 12,000, preferably from about 900 to about 4,000.

The tricarboxylic acid (iii) (a) (2) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3′,4-dipheneyl tricarboxylic anhydride, 3,3′,5-benzophenone tricarboxylic anhydride, 1,3,4-cyclopentane tricarboxylic anhydride, 2,2′,3-diphenyl tricarboxylic anhydride, diphenyl sulfone-3,3′,4-tricarboxylic anhydride, ethylene tricarboxylic anydride, 1,2,5-naphthalene tricarboxylic anhydride, 1,2,4-butane tricarboxylic anhydride, and 1,3,4-cyclohexane tricarboxylic anhydride. These tricarboxylic acid materials can be characterized by the following general formula

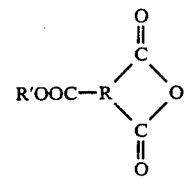

wherein:

R is a trivalent organic radical, preferably a $C_1$–$C_{20}$ aliphatic or cycloaliphatic, or $C_6$–$C_{20}$ aromatic trivalent radical;

R′ is preferably hydrogen or a monovalent organic radical which is preferably selected from $C_1$–$C_6$ aliphatic and/or cycloaliphatic radicals and $C_6$–$C_{12}$ aromatic radicals, e.g., benzyl; R′ is most preferably hydrogen.

In the preparation of the instant high molecular weight polyetherimide ester polymers sufficient amounts of diol versus dicarboxylic acid, and tricarboxylic acid versus diamine must be present, as recognized in the art, to allow for substantially complete polymerization.

This type of one-pot reaction involving the reactions of (i) a diol component, (ii) a dicarboxylic acid component, (iii) (a) (1) a poly(oxy alkylene)diamine component, and (iii) (a) (2) a tricarboxylic acid component is described in U.S. Pat. No. 4,556,688 to McCready et al. incorporated herein by reference.

The instant high molecular weight polyetherimide esters olicomers or prepolymers may also be prepared by a two-pot synthesis involving the reaction of the diol (i), the dicarboxylic acid (ii), and the polyoxyalkylene diimide diacid (iii) (b). Such a reaction is described in U.S. Pat. No. 4,556,705 to McCready, incorporated herein by reference and U.S. Pat. No. 4,732,948, also already incorporated by reference.

The polyoxyalkylene diimide diacid (iii) (b) may be represented by the general formula

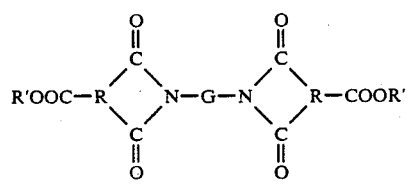

wherein G, R and R′ are as defined hereinafore.

The polyoxyalkylene diimide diacids of Formula III suitable for use herein are high molecular weight diimide diacids having an average molecular weight greater than about 700, preferably greater than about 900. They may be prepared by the imidization reaction of one or more tricarboxylic acids (iii) (a) (2) containing two vicinal carboxyl groups or an anhydride group and an additional carboxyl group which must be esterifiable with the high molecular weight poly(oxy alkylene)diamine (iii) (a) (1). These polyoxyalkylene diimide diacids and processes for their preparation are disclosed in U.S. Pat. No. 4,556,705, incorporated herein by reference. Briefly, these polyoxyalkylene diimide diacids may be prepared by known imidization processes including melt synthesis or by synthesizing in a solvent system. Such reactions generally occur at temperatures from about 100° C. to about 300° C., preferably at temperatures from about 150° C. to about 250° C., while drawing off water or in a solvent system at the reflux temperature of the solvent or azeotropic (solvent) mixture.

In this two-pot process, as in the one-pot process described hereinafore, it is generally preferred that the diol be present in at least a molar equivalent amount, preferably a molar excess, most preferably at least 150 mole % based on the moles of dicarboxylic acid and polyoxyalkylene diimide diacid combined. Such molar excess of diol generally allows for optimal yields, based on the amount of acids, while accounting for the loss of diol during esterification.

In this two-pot process the amount of polyoxyalkylene diimide diacid and dicarboxylic acid utilized is generally not critical in forming the polyetherimide esters of the present invention. However, preferred amounts of the polyoxyalkylene diimide diacid and dicarboxylic acid are such that the weight ratio of the polyoxyalkylene diimide to the dicarboxylic acid is from about 0.002 to 2.0:1, preferably from about 0.01 to 2.01:1, more preferably from about 0.25 to 2.0:1, and most preferably from about 0.4 to 1.4:1.

It is also possible, as described in U.S. Pat. No. 4,556,688, to prepolymerize the aromatic dicarboxylic acid and the diol to form a prepolyester, and then react this prepolyester with either the diimide diacid or with the tricarboxylic acid and the poly(oxy alkylene)diamine. Forming the prepolyester can be achieved by conventional esterification techniques such as those described in U.S. Pat. Nos. 2,465,319 and 2,910,466, all of which are incorporated by reference.

In its preferred embodiment, the high molecular weight polyetherimide esters of the instant invention comprise the reaction products of dimethylterephthalate, optionally with up to 40 mole percent of another dicarboxylic acid or its ester forming derivative; butane diol, optionally with another diol such as butene diol, hexanediol, or cyclohexane dimethanol; and either a poly(oxy alkylene)diamine having and average molecular weight of from about 600 to about 12,000, preferably from about 900 to about 4,000, and trimellitic anhydride, or a polyoxyalkylene diimide diacid.

In the process of the present invention, particularly where all of the reactants are charged to the reactor together or where the polyoxyalklene diimide diacid is preformed and excess tricarboxylic acid is present, a minor amount of the tricarboxylic acid or anhydride may react with available hydroxyl groups and ultimately function as a branching agent in the finished polymer. Within limits, the degree of branching in the finished polymer can be controlled by varying the mole ratio of tricarboxylic acid to poly(oxy alkylene)diamine. An excess of diamine reduces the degrees of branching, while an excess of the tricarboxylic acid increases branching. In addition to controlling branching by varying the tricarboxylic acid/diamine mole ratio, one can compensate for branching by introducing a monofunctional reactant such as benzoic acid in minor amounts.

With reference to branching, it should be noted that polymers of this invention, when prepared from preformed diimide diacid, are substantially free of branching. If branching is desired, one needs only to introduce a branching agent, such as trimellitic anhydride, along with the preformed diimide diacid. The amount of branching agent will generally be less than about 0.15 moles per mole of diimide diacid. Useful branching agents other than trimellitic anhydride include trimellitic acid, trimethyl trimellitate, glycerol, trimethylol propane, trimesic acid and its esters, and the like.

The instant high molecular weight polyetherimide esters may be prepared by conventional esterification/condensation reactions for the production of polyesters. These processes are described, inter alia, in U.S. Pat. Nos. 3,763,109; 3,651,014; 3,801,547; 4,556,705, and 4,556,688, all of which are incorporated herein by reference.

The high molecular weight polyetherimide esters of the instant invention contain at least the following two recurring structural units;

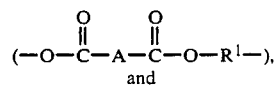

and

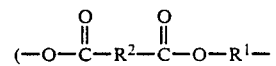

wherein:

A is the residue of the polyoxyalkylene diimide diacid absent the two carboxyl groups, i.e.,

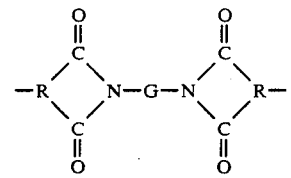

$R^1$ is the residue of the diol absent the two hydroxyl groups.

$R^2$ is the residue of the dicarboxylic acid absent the two carboxyl groups, and G is as defined hereinafter.

Additionally, while not required, it is customary and preferred to utilize a catalyst or catalyst system in the process for the production of the present polyetherimide esters. These types of catalysts are set forth in U.S. Pat. Nos. 4,556,705 and 4,566,688, both of which are incorporated herein by reference.

Both batch and continuous methods can be used for any stage of the ether imide ester polymer preparation. Polycondensation of the polyester prepolymer with the polyoxyalklene diimide diacid can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer.

The amount of high molecular weight polyetherimide ester resin utilized in the composition of the present invention will be an amount suitable to cause a decrease in the warpage of the resultant molded product. Generally speaking, the amount of high molecular weight polyetherimide ester elastomer utilized will vary from about 5 to about 15 parts by weight per 100 weight parts of the total composition, including resins, elastomers, stabilizers, fillers, etc. and, most preferably, will vary from about 8 to about 12 parts by weight per 100 parts by weight of the total composition.

The resinous components can be varied widely in order to meet certain specific physical property requirements. The resinous component of the composition of the present invention can consist entirely of one resin such as poly(1,4-butylene) terephthalate (PBT) or poly(ethylene terephthalate) resin (PET). Most preferably, the resinous component will consist of a combination of poly(1,4-butylene terephthalate) resin and poly(ethylene terephthalate) resin. In order to show the effect of the high molecular weight elastomer, the preferred weight ratio of PBT to PET will range from 1 to 2. In such instances, the preferred weight ratio of poly(1,4-butylene terephthalate) to poly(ethylene terephthalate) will range from about 1-2 to 1 and most preferably from 1.4-1.8 to 1.

The additives to the polyester can be intimately blended in a number of procedures. In one way, the warpage control additive, the high molecular weight polyetherimide ester elastomer (HMWPEE) is precompounded with the dry polyester resin or resins and then put into an extruder. The total blend is then heated at an elevated temperature, e.g., 220° C. to 250° C., and extruded to produce molding pellets. The additive compound or compounds are thoroughly dispersed in the molten polyester resin by the process. In another procedure, the warpage control additive is mixed with the polyester resin or resins by blending at ordinary temperatures, then the blend is fluxed on a mill, heated, e.g., at 210°-240° C. then cooled and comminuted; or the blend can be extruded at 220°-250° C., cooled and chopped. The additive can also be mixed with the powder or granular polyester and the mixture can be heated and directly formed into blow molded items using machines which compounds and molds into final parts for test or end use.

It should be understood that the polyesters modified by the warp control additives according to this invention may contain one or more conventional additives such as, for example, antioxidants, carbon black, reinforcing agents, plasticizers, lubricity promoters, color stabilizers, ultraviolet absorbers, X-ray opacifiers, dyes, pigments, fillers, mold release agents such as polyethylene, and the like.

Satisfactory thermal, oxidative and/or ultraviolet stabilizers comprise phenols and their derivatives, amines and their derivatives, compounds containing both hydroxyl and amine groups, hydroxyazines, oximes, polymeric phenolic esters and salts of multivalent metals in which the metal is in its lower state.

In a preferred features of the present invention, the agents composition of the present invention will include reinforcing agents such as fibrous (filamentous) glass and/or mineral fillers, such as clay, mica, talc and the like. The fillers can be untreated or treated with silane or titanate coupling agents, etc. The filamentous glass to be employed as reinforcement in such embodiments of the present compositions is well known to those skilled in the art and is widely available from a number of manufacturers.

DESCRIPTION OF THE PREFERRED EMBODIMENTS

The following examples illustrate the present invention. They are set forth as a further description but are not to be construed as limiting the invention thereto. Examples 1 and 3 do not utilize high molecular weight polyetherimide ester elastomer and are presented for comparative purposes only.

In the examples all parts and percentages are on a weight basis unless otherwise specified.

All compositions were prepared by dry blending the ingredients followed by extrusion with a Prodex single screw extruder at approximately 240° C.

The extrudate was pelletized and molded in disc having a 10.16 cm diameter and 0.08 cm in thickness. Warpage control studies were done pursuant to ASTM D 1181-56, and the results of these studies are set forth in Table I below.

TABLE I
(ALL PARTS ARE PERCENT BY WEIGHT)

| COMPONENTS | EX. 1 | EX. 2 | EX. 3 | EX. 4 |
|---|---|---|---|---|
| PBT | 29.65 | 29.65 | 27.65 | 27.65 |
| PET | 20 | 20 | 20 | 20 |
| Glass Fibers | 20 | 20 | 20 | 20 |
| Mica | 20.00 | 20.00 | 20.00 | 20.00 |
| Antioxidant | 0.20 | 0.20 | 0.20 | 0.20 |
| MRA | 0.15 | 0.15 | 0.15 | 0.15 |
| PEE | 10.00 | — | 10.00 | — |
| HMWPEE | — | 10 | — | 10 |
| Black Color Conc. | — | — | 2.00 | 2.00 |
| Warpage, mm before/after 170° C. 30 min annealing | 1.6/6 | 0/0 | 2/12 | 0/6.3 |

The Black Color Concentrate was a mixture of 25 weight percent carbon black and 75 weight percent PBT.

PBT is poly(butylene terephthalate).

PET is poly(1,4-ethylene terephthalate).

The antioxidant utilized was 1,3,5-trimethyl-2,4,6-tris(3,5-di-tert-butyl-4-hydroxybenzyl) benzene, manufactured and sold by CIBA-GEIGY under the tradename Irganox 1330.

MRA is short for a mold release agent, pentaerythritol tetrastearate, (PETS) manufactured by Glyco Chemical Company.

PEE is short for polyetherimide ester elastomer, having a melt viscosity in the range of 500-700 poise measured by the Tenius Olson melt indexer at 250° C. with a 0.1 centimeter orifice, and an average intrinsic viscosity of 0.9 dl/g.

HMWPEE is short for a high molecular weight polyetherimide ester elastomer having an MV in the range of 2,000-2,500 poise and an average intrinsic viscosity of 1.4 dl/g.

The data listed illustrates how HMWPEE, as compared with lower molecular weight, PEE, effectively reduced warpage in regular as well as pigmented glass fiber filled reinforced copolyester compositions.

What is claimed is:

1. A thermoplastic molding composition which after molding, possesses increased resistance to warpage, the composition comprising, in admixture:
   (a) at least one polyester resin; and
   (b) a warpage decreasing amount comprising from about 5 to about 15 parts by weight, per 100 parts by weight of the total composition of a high molecular weight polyetherimide ester resin that has an intrinsic viscosity of at least 1.2 when measured in a solution comprising 60% by weight tetrahydrofuran and 40% by weight phenol at ambient temperature.

2. The composition of claim 1 wherein the high molecular weight polyetherimide ester resin has an intrinsic viscosity of at least 1.4 when measured in a solution comprising 60% by weight tetrahydrofuran and 40% by weight phenol at ambient temperature.

3. The composition of claim 1 where the polyester resin is a polyterephthalate resin.

4. The composition of claim 1 wherein the polyterephthalate resin is selected from poly(1,4-butylene terephthalate) resin or poly(ethylene terephthalate) resin, or a combination thereof.

5. The composition of claim 1 further comprising a filler.

6. The composition of claim 5 wherein the filler is mica.

7. The composition of claim 1 further comprising a reinforcing agent.

8. The composition of claim 7 wherein the reinforcing agent is glass fibers.

9. The composition of claim 1 wherein high molecular weight polyetherimide ester resin is comprised of the reaction products of:
   (a) at least one diol;
   (b) at least one dicarboxylic acid or an ester forming reactive derivative thereof; and
   (c) a set of reactants selected from
      (1) (i) at least one high molecular weight poly(oxy alkylene)diamine, and (ii) at least one tricarboxylic acid or a derivative thereof, or
      (2) at least one high molecular weight polyoxyalkylene diimide diacid.

10. The composition of claim 9 wherein said diol is a low molecular weight diol.

11. The composition of claim 10 wherein said diol is selected from butanediol, butenediol, hexanediol, cyclohexane dimethanol, or mixtures thereof.

12. The composition of claim 11 wherein said diol is butanediol.

13. The composition of claim 9 wherein said dicarboxylic acid is an aromatic dicarboxylic acid or its ester forming reactive derivative.

14. The composition of claim 13 wherein said dicarboxylic acid or its ester forming reactive derivative is dimethyl terephthalate.

15. The composition of claim 9 wherein said poly(oxyalkylene)diamine has an average molecular weight of from about 600 to about 12,000 and is represented by the formula

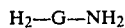

wherein G is the residue remaining after the removal of the amino groups of a long chain poly(alkylene ether) diamine.

16. The composition of claim 15 wherein said poly(oxyalkylene)diamine has an average molecular weight of from about 900 to about 4,000.

17. The composition of claim 1 further comprising a phenolic stabilizer.

18. The composition of claim 1 wherein there is from about 8 to about 12 parts by weight of polyetherimide ester resin per 100 parts by weight of the total composition.

* * * * *